United States Patent
Cabrera

[11] Patent Number: 6,065,774
[45] Date of Patent: May 23, 2000

[54] FILTRATION SYSTEM FOR GAS GENERATORS

[75] Inventor: Raul Cabrera, Tampa, Fla.

[73] Assignee: Breed Automotive Technology, Inc., Lakeland, Fla.

[21] Appl. No.: 09/173,199

[22] Filed: Oct. 15, 1998

[51] Int. Cl.[7] .................................................. B60R 21/28
[52] U.S. Cl. ........................ 280/741; 280/740; 149/36; 149/62; 149/76
[58] Field of Search .................... 280/741, 740; 149/740, 36, 62, 76

[56] References Cited

U.S. PATENT DOCUMENTS

| | | | |
|---|---|---|---|
| 3,785,674 | 1/1974 | Poole et al. | 280/150 |
| 3,871,684 | 3/1975 | Staudacher et al. | 280/741 |
| 3,958,949 | 5/1976 | Plantif et al. | 23/281 |
| 4,316,874 | 2/1982 | Kasama et al. | 422/126 |
| 4,561,675 | 12/1985 | Adams et al. | 280/734 |
| 4,858,951 | 8/1989 | Lenzen | 280/741 |
| 5,016,941 | 5/1991 | Faigle et al. | 280/741 |
| 5,035,757 | 7/1991 | Poole | 149/46 |
| 5,104,466 | 4/1992 | Allard et al. | 149/21 |
| 5,114,179 | 5/1992 | Emery et al. | 280/741 |
| 5,186,491 | 2/1993 | Yoshida et al. | 280/741 |
| 5,443,286 | 8/1995 | Cunningham et al. | 280/741 |
| 5,468,016 | 11/1995 | Kobari et al. | 280/741 |
| 5,470,406 | 11/1995 | Ochi et al. | 149/35 |
| 5,503,806 | 4/1996 | Fulmer et al. | 280/740 |
| 5,531,941 | 7/1996 | Poole | 264/3.4 |
| 5,551,724 | 9/1996 | Armstrong, III et al. | 280/741 |
| 5,609,360 | 3/1997 | Faigle et al. | 280/741 |
| 5,700,973 | 12/1997 | Siddiaui | 280/741 |
| 5,743,560 | 4/1998 | Jackson et al. | 280/741 |
| 5,756,929 | 5/1998 | Lundstrom et al. | 149/36 |

OTHER PUBLICATIONS

Ebling et al., "Development of gas fenerators for fire extinguishing", Propellants, Explosives, Pyrotechnics, (Jul. 1997) vol. 22(3), pp. 170–175.

Primary Examiner—Charles T. Jordan
Assistant Examiner—Glenda L. Sánchez
Attorney, Agent, or Firm—Beth Vrioni; Lonnie Drayer; Donal O. Nickey

[57] ABSTRACT

A new filtration system for gas generators, especially side impact airbag inflators for use in automobiles, has a sheet of expanded metal formed into a tube, cylinder or other geometric form and a bed of expanded metal chips. The interior of the geometric form is filled with chips of expanded metal and this configuration has been found extremely effective in cooling and filtering the gases produced during the combustion of a gas generant. The filtration system disposed between the gas generant bed and the gas exit apertures of the inflator housing. The weight of the filtration system should be at least four times the weight of the gas generant placed in the inflator housing.

5 Claims, 2 Drawing Sheets

FILTRATION SYSTEM FOR GAS GENERATORS

TECHNICAL FIELD

The present invention relates generally to the use of non-azide gas generants in vehicle airbag inflators and in fire extinguishing, and more specifically to filter designs for use with gas generants. One problem with non-azide based gas generants is their typically high combustion temperatures and particulate production. The present invention provides a filter design that not only efficiently filters the particulates and slag from the combustion gases, but also effectively cools the gases. The filtration system comprises expanded metal surrounding chips of expanded metal.

BACKGROUND OF THE INVENTION

Automobile airbag systems have been developed to protect the occupant of a vehicle in the event of a collision by rapidly inflating a cushion or bag between the vehicle occupant and the interior of the vehicle. The inflated airbag absorbs the vehicle occupant's energy to provide a gradual, controlled de-acceleration and provides a cushion to distribute body loads and keep the occupant from impacting the hard surfaces of the vehicle interior.

Much effort has been expended on the development of inflator housings. The inflator housing is the metal shell in which the gas generant is placed and which is ignited by an ignition system when the airbag needs to be inflated. The housing is fitted with the airbag and together they form a critical part of any automobile airbag system. Engineers of automobile airbag systems understand that the design of the housing can influence the performance of the gas generant and the overall safety of the vehicle occupant.

Driver and passenger restraint systems have become commonplace in the automotive industry. Recently, the automotive industry has been installing side impact airbags in automobiles. Side impact airbags present special problems due to size constraints and configuration. The size limitations and location of the inflators require the use of a relatively cool gas to inflate the airbag, otherwise, damage to the bag will be caused by the hot gases.

Hybrid inflators have been proposed as an alternative to the azide and non-azide gas generants. In a hybrid inflator, a canister of pressurized gas is combined with a chemical gas generant. The chemical gas generant, when ignited, ruptures a seal on the pressurized canister and the gases from the canister and the chemical reaction then mix and are used to inflate the airbag.

Hybrid inflators have their own set of problems The major problem deals with reliability over the expected lifetime of the automobile, which may be ten to fifteen years or longer. No matter how carefully the canisters are sealed, leakage occurs through welds and the rupturable seals. If only a portion of the gas escapes over the lifetime of the vehicle, the hybrid inflator will not function properly when called upon to protect a vehicle occupant. In addition, hybrid inflators may not function consistently over a wide temperature range. Further, due to the increased complexity of the hybrid inflator, the costs of production materials and associated labor are prohibitive.

The industry would welcome an improved gas generant type inflator for side airbags, however, as discussed above, the chemical gas generants present potential problems with damage to the bag itself. Through the creative combination of material selection and design, the present invention provides a solution to the problems associated with chemical gas generants for inflators for side airbags.

BACKGROUND ART

U.S. Pat. No. 5,035,757 to Poole discloses gas generant compositions, devoid of azides, which yield solid combustion products that are easily filtered. This patent provides a good discussion of formulating non-azide based gas generants.

U.S. Pat. No. 5,531,941 to Poole discloses an azide-free gas generant composition that comprises a mixture of tri-aminoguanidine nitrate (TAGN) as the fuel and phase stabilized ammonium nitrate (PSAN) as the oxidizer.

In a publication by Ebeling et al. entitled, "Development of gas generators for fire extinguishing", Propellants, Explosives, Pyrotechnics, (July, 1997) Vol. 22(3), p. 170–175, the authors evaluate the idea of using gases or aerosols produced by solid energetic or pyrotechnic materials for fire extinguishing. The authors considered the class of nitrogen rich, low carbon content compounds, such as nitroguanidine (NO), TAGN and 5-amino-1H-tetrazole (5-AT). The reference fails to suggest that the gas generator housing (i.e., inflator housing) incorporate a filter system that comprises a sheet of expanded metal and expanded metal chips, wherein the filtration system is disposed between the gas generant bed and the gas exit apertures of the inflator housing.

Filters are placed in inflator housings to trap molten material produced during the combustion of the gas generant and to cool the exhaust gases. The filtration system of the present invention is a sheet, strip or ribbon of expanded metal that is formed into a tube, cylinder or other geometric shape having a void; the void is then filled with chips or pieces of expanded metal. The filtration system according to the invention is placed within the inflator housing between the gas generant bed and the gas exit portals of the housing. While the placement of a filter within the housing is conventional, the presently disclosed filtration system provides unexpectedly improved results with minimal labor and material cost. The following is a brief discussion of conventional approaches to filtering combustion gases.

U.S. Pat. No. 3,785,674 to Poole et al. discloses an inflator housing designed so that the combustion gases to pass through a separating screen and then a steel wool filter, and then into a secondary reacting chamber which "reacts out" the undesirable combustion products while permitting the free nitrogen to pass therethrough.

U.S. Pat. No. 3,958,949 to Plantif et al. describes an inflator housing with a combustion chamber laterally surrounded by a cooling chamber. The solid coolant material contained within the cooling chamber consists of potassium perchlorate containing copper chromite as a decomposition catalyst. To prevent solid particles from being expelled from the generator, retaining grids are placed adjacent to the discharge apertures.

U.S. Pat. No. 4,316,874 to Kasama et al. discloses a gas generator utilizing granular silicon carbide as a coolant. The generally cylindrical housing assembly has disposed within it two (2) cylindrically shaped stainless steel wire screens so that the interior of the housing is partitioned into a cylindrical central space and a radially outer annular space. The annular space defined between the two wire screens is filled with granular silicon carbide.

U.S. Pat. No. 4,561,675 to Adams et al., while primarily directed to autoignition of the gas generant, also discloses an inflator that uses multiple filters and a tortuous gas path to remove particulates and cool the combustion gas. More specifically, this patent teaches that the gas generant pellets be surrounded by an annular inner screen pack or combustion filter. The inflator also possesses an outer screen pack or filter that desirably includes a coarse layer adjacent the inner surface of the cylindrical housing.

In yet another airbag inflator design, U.S. Pat. No. 4,858,951 to Lenzen discloses an inflator wherein the gas generated by the combustion of the generant flows radially through openings in a rigid cylindrical metal tube which surrounds the gas generant pellets. The gas then flows through a filter which is made of a plurality of layers of wire mesh, steel wool and fiberglass.

A hybrid inflator is described in U.S. Pat. No. 5,016,914 to Faigle et al. A hybrid inflator uses a gas generant to heat an inert gas stored in a container or canister within the inflator. The separation of solid residue from the generated gas is accomplished in this reference by a 180° turn at the end of the outer housing. At least some of the relatively large particles are inertially removed from the nitrogen gas stream and impinge and fuse against the doomed surface which is preferably coated with a high temperature grease which helps capture the particles.

Various other inflator configurations and filter systems are disclosed in U.S. Pat. Nos. 5,104,466; 5,114,179; 5,186,491; 5,443,286; 5,468,016; and 5,470,406. Typically, the prior art filters have consisted of wire gauze and/or inorganic fiber. Also disclosed in the prior art is the winding of stainless steel screens, fine-mesh woven metal wire, close-woven metal wire, etc. in layers to form filters that function to cool the combustion gas and remove the combustion residue or slag. While numerous filter designs are known, the prior art has failed to suggest or disclose the use of a sheet of expanded metal to form a container for chips of expanded metal.

SUMMARY OF THE INVENTION

One aspect of the present invention provides a method for producing an airbag inflator or gas generator housing that comprises the improved filtration system disclosed herein. More specifically, the invention is directed to the use of expanded metal to form the filtration system which is disposed within the inflator housing. The filtration system according to the invention efficiently and economically traps slag and particulates while cooling the combustion gases to temperatures that are useful in side impact airbags.

While the filtration system of the invention is preferably used with non-azide gas generants, it should be understood that it would also be effective with the azide based gas generants and in hybrid inflators. Important beneficial aspects of the inventive filtration system include: the quantity of harmful gases that are generated upon combustion of the gas generant is low; it has a high gas through-put; low toxicity of construction materials; low cost of production; availability of basic materials; processing on a large scale is possible; and potential for recycling.

An additional aspect of the invention relates to the use of a non-azide gas generant in an inflator that comprises the novel filter system. More specifically, there is disclosed an inflator for use in inflating an occupant restraint system in response to a vehicle collision signal comprising:

a) housing means defining at least one discharge port for directing a gaseous flow from said housing means;

b) gas generating means disposed within the said housing means;

c) an ignition unit; and d) a filter means wherein said filter means is disposed between said discharge port and said gas generating means; said filter means comprises: 1) a sheet of expanded metal configured into a geometric form that defines a void; and 2) chips of expanded metal within said void.

There is also disclosed a filtration system for use in conjunction with a gas generant, said system comprising a sheet of expanded metal and chips of expanded metal.

Also disclosed is a filtration system for filtering particulates from a combustion gas of a gas generant said system comprising a sheet of expanded metal configured to define a void and chips of expanded metal filling said void, wherein the weight ratio of said sheet to said chips is less than 10 to 1.

In a more preferred embodiment of the inflator according to the invention, the gas generating means comprises a non-azide gas generant. In a further embodiment of the inflator, the expanded metal comprises apertures of at least about 0.8 mm (about ⅟₃₂ inch) on each side or in diameter. More preferably, the openings are at least 1.5 mm, and most preferably at least 2.0 mm in size. The expanded metal is made of any type of metal having a melting point above about 1000° C. Representative of such metals are 304, 309, 310, 316 and 330 stainless steel, 1018 cold rolled steel, iron and metal alloys. The chips are pieces of the expanded metal that may be of any shape but are preferably squares or rectangles with sides of at least 3 mm.

It will be understood that the size and configuration of the housing will dictate the dimensions of the inventive filtration system. However, for a typical side impact inflator, the length of the expanded metal sheet can range from 10 to 30 cm (4–12 inches) and the width can range from 5 to 20 cm (2–8 inches). The thickness of the expanded metal can range from 0.1 to 2.0 mm depending on the metal selected. In a preferred embodiment, the metal is cold rolled steel at a thickness of about 0.635 mm (0.025 inches). A factor to be considered when making a metal selection and thickness thereof, is the amount of force required to form the expanded metal into the desired shape, such as a tube, cylinder or the like. The geometric shape may be formed using any number of techniques such as wrapping the sheet of expanded metal around a mandrel and the like.

Expanded metal is typically prepared by placing small cuts or slices into a solid sheet of metal through the use of a die that expands the cuts into openings, i.e., diamond-shaped openings or apertures. Expanded metal is available from a number of commercial sources such as Metalex, Inc. of Libertyville, Ill.; Exmet Corporation of Naugatuch, Conn. and Spantek Division of Upper Midwest Industries, Inc. of Hopkins, Minn. Most ferrous and non-ferrous metals can be used to prepare the expanded metal, however, only those with melting points above about 1000° C. are useful in the present invention. The process of preparing the expanded metal converts a solid sheet or plate metal into a material of regular diamond-shaped or almost square openings joined by continuous, uniform strands. In one method of preparing the expanded metal, a simultaneous slitting and stretching process generates the expanded material with essentially no scrap. The result is a strong, structurally sound, non-raveling metal product that permits the passage of heat, light, sound and air.

Expanded metal is available in flattened and unflattened forms. As the material can be produced with virtually no scrap and does not ravel, it has economic and production advantages over perforated metal or wire cloth. The open area of the expanded metal useful in the filtration system of the present invention can range from 30–85%. An open area of 35–75% is preferred, while 40 to 60% is more preferred and about 50% is most preferred.

The diamond-shaped or almost square openings of the expanded metal useful in the present invention have two (2) dimensions that are recognized by the industry: the short way of the opening (SWO) which is the distance across the short opening of the diamond from a point on the inside of the bond (the solid intersection of two strands) to a corresponding inside point of the next bond; and the long way of the opening (LWO), which is the distance across the long opening of the diamond from a point on the inside of the bond to a corresponding inside point of the next bond. An expanded metal with SWO's of from 1–10 mm and LWO's of 2–15 mm are useful in the inventive filtration system.

The "strand" is the metal that forms the diamond openings. When two (2) strands intersect a bond is formed. The strand width may vary from 0.5 to 5 mm. Generally, the strand width should be greater than the starting sheet metal thickness.

The expanded metal useful in the present invention may also be of the "solid interspersed" type, that being a material where solid metal is dispersed between sections of expanded metal.

The geometric shape or form (i.e., tubes, cylinders, squares and the like) into which the expanded metal is configured should comprise at least two (2), more preferably three (3), and most preferably at least four (4) layers of expanded metal. The chips of expanded metal can be of the same material used to prepare the geometric form or they may be different. The chips of expanded metal may be in a shape such as, square, rectangular, circular, triangular and the like. The preferred shapes are square and rectangular. The dimensions of the chips can range from 3 to 25 mm on a side, or in diameter (⅛–1 inch), depending upon the size of the void created by the expanded steel geometric form. For example, the chips useful in a passenger inflator housing can range from ½ to 1 inch while in a typical side impact housing, the chips would range from about 3 to 10 mm (⅛–⅜ inch) with about 6 mm (¼ inch) being preferred.

The size and shape of the chips is somewhat critical as the void defined by the geometric form must be filled with a sufficient level of chips for the filter system to work effectively. For example, for every 10 grams of expanded metal used to prepare the geometric form, at least 1, more preferably at least 3 and most preferably at least 4 grams of chips should be placed within the void. Thus, weight ratios of less than 10 to 1, expanded sheet metal to chips (i.e., 10 to 4) are useful in the invention. This configuration ensures the complete combustion of the propellant load (i.e., gas generant) and also provides excellent filtration since the gases must take a tortuous path to exit the inflator. This feature has been discovered by the inventor after other designs of expanded metal and the chips failed to allow for the complete combustion of the generant and/or poor filtering and/or poor cooling efficiencies.

The filter system of the invention, while primarily directed to use in vehicle occupant restraint systems, can also be applied to fire extinguishing systems using pyrotechnic material.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings in which:

DETAILED DESCRIPTION OF THE INVENTION

The gas generant formulations used in conjunction with the filter system of this invention can be formulated from the azide family of fuels such as sodium azide; the guanidine family of fuels such as guanidine nitrate (GN), triaminoguanidine nitrate (TAGN) and the tetrazoles such as 5-aminotetrazole. The fuel component will typically comprise between about 35 and about 70 weight %, more preferably between 50 and 60 weight %, of the gas generant composition, while the oxidizer system will typically comprise between about 30 and about 50 weight %, more preferably between 40 and 50 weight %, of the gas generant composition. The preferred family of fuels useful with the filtration system of the invention are the non-azide fuels. Processing aids, such as silicon dioxide, may also be used in formulating the gas generant pellets. Those skilled in the art understand that depending upon the particular oxidizers and fuels utilized, certain processing aids have beneficial properties over others.

The invention will now be illustrated in greater detail by way of specific reference to the drawings.

Figure 1:
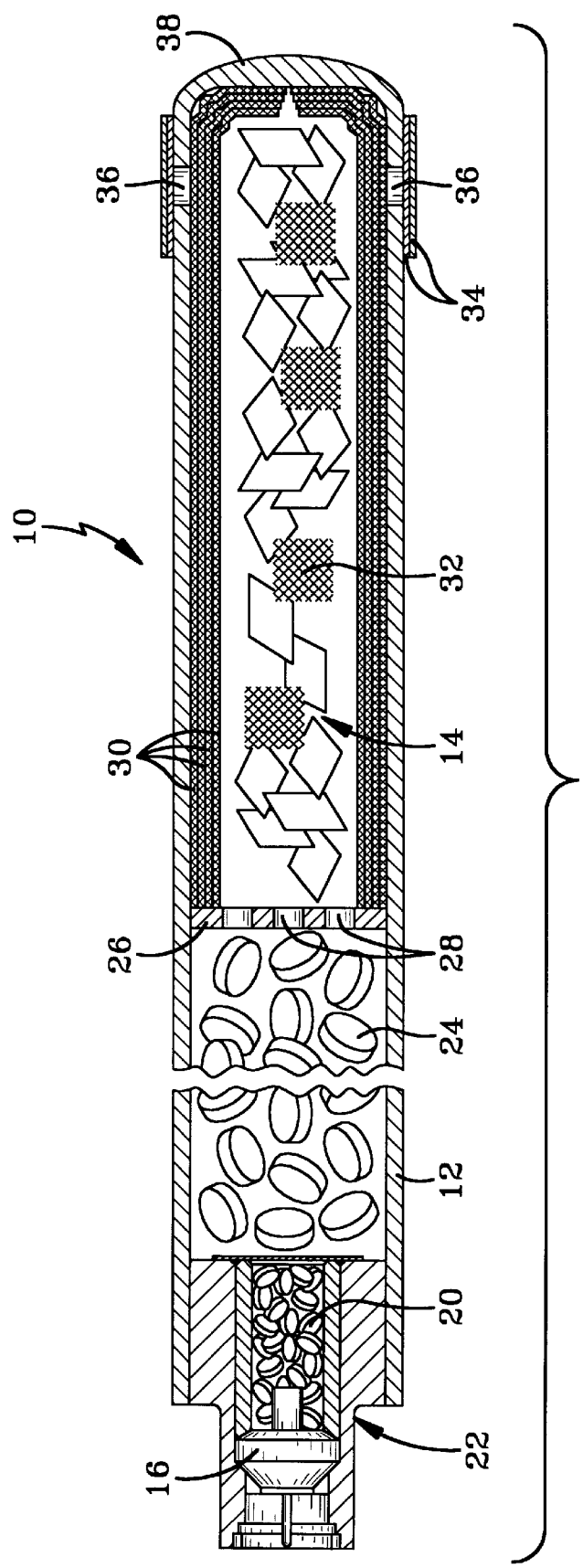
FIG. 1 is a side view in cross section of a typical side impact inflator including the filtration system according the invention.

Referring to FIG. 1, there is represented in cross sectional view, a representative side impact inflator 10 including the filtration system according to the invention 14 which was employed in testing of the gas filtration system disclosed herein. The housing member 12 and the igniter 22 are attached to one another through "friction or inertia welding". The igniter 22 comprises an electrical squib 16 and enhancer pellets 20. The inflator 10 also comprises the inventive filtration system 14 and gas exit portals 36. The filtration system 14 comprises a sheet of expanded metal 30 shaped into a tube and the expanded metal chips 32. The bed of gas generant pellets 24 is separated from the filter system by a choke plate 26 which comprises five (5) holes 28 with a diameter of about 5 mm. Metal foil 34 lines the annular surface of the housing 12 covering gas exit portals 36.

The size and number of the exit portals 36 can be varied to control the desired combustion level (i.e., rate of pressure generation). The sheet of expanded metal 30 is coiled or rolled into a tube which is placed inside the housing 12 and forced into the closed end 38 of the housing 12 so that the edges of the expanded metal tube converge or almost converge.

Figure 2:
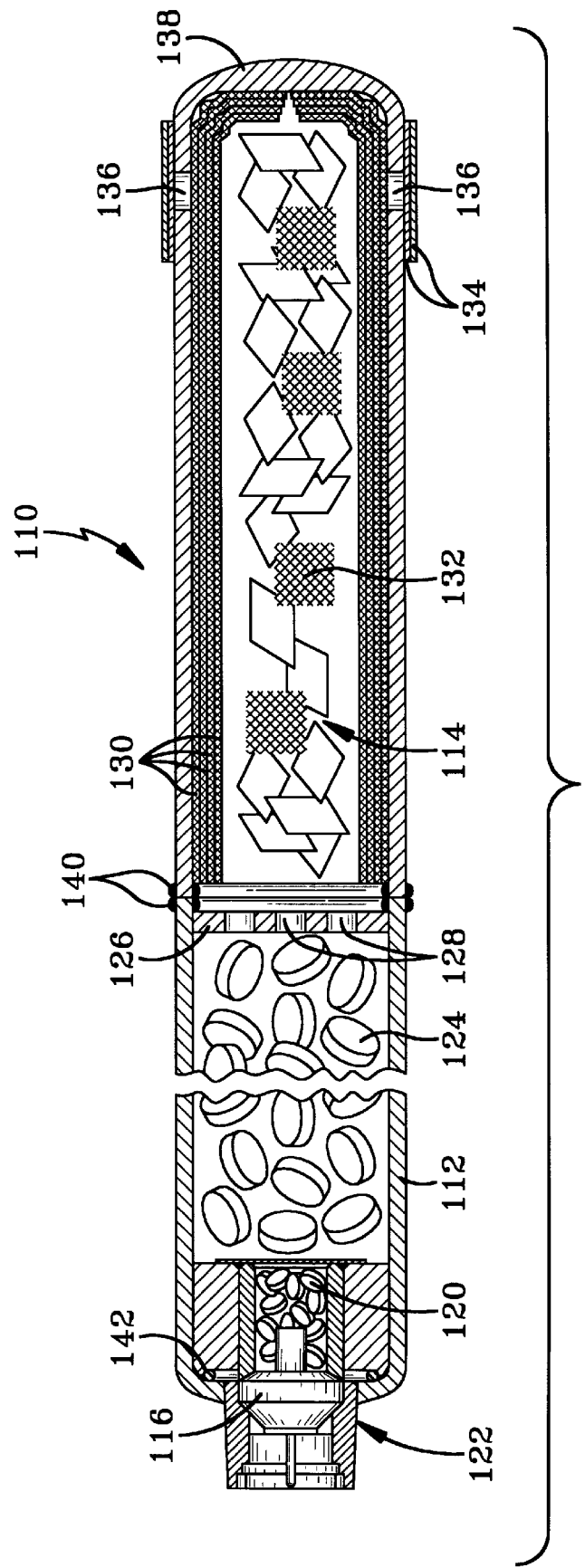
FIG. 2 is a side view in cross section of another embodiment of the side impact inflator wherein the housing is friction welded.

Referring to FIG. 2, there is represented in cross sectional view, a representative side impact inflator 110 including the filtration system according to the invention 114, wherein the housing member 112 is made up of two (2) parts that are welded together by weld 140. An igniter 122 is press fitted into housing member 112. The igniter 122 comprises an electrical squib 116 and enhancer pellets 120. An "O" ring 142 seals the igniter 122 in the housing member 112. The inflator 110 also comprises the inventive filtration system 114, gas exit portals 136, a bed of gas generant pellets 124, and a choke plate 126 with five (5) apertures 128 with a diameter of about 5 mm. The filtration system 114 comprises a sheet of expanded metal 130 shaped into a tube which surrounds the expanded metal chips 132. The expanded metal sheet 130 is coiled into a tube and placed inside the housing 112 and forced into the closed end 138 of the housing 112 so that the edges of the expanded metal tube converge or almost converge. Metal foil 134 covers gas exit portal 136.

The inventor has discovered that an expanded metal geometric form in combination with expanded metal chips can economically produce a filter that effectively cools the gas and removes particulates and slag generated when the gas generant is burned. As mentioned above, the metal from which the filter system is produced can be any metal with a melting point high enough to survive the combustion of the gas generant. The thickness of the expanded metal can range from 0.010 to 0.050 inches with about 0.020 to 0.030 inches being more preferred and about 0.025 inches being the most preferred.

Another important aspect of the filter system is that expanded metal chips are placed inside the geometric form (created by forming the sheet of expanded metal) are properly sized to permit packing of the chips into the void at a weight ratio of at least 1 gram of chips per 10 grams of sheet expanded metal, more preferably at least 3 grams of chips per 10 grams of sheet expanded metal and most preferably at least 5 grams of chips per 10 grams of sheet expanded metal. This aspect is important as it aids in creating a tortuous path for the gases. Further, the use of the expanded metal for the chips and the geometric form provides a large surface area for the capture of particulates and cooling of the gas.

One additional aspect of the invention is that through subtle changes in the levels and configurations of the various components (i.e., the number of layers of expanded metal, the ratio of chips to sheet expanded metal, the shape of the geometric form, and the like), the filter can be modified to function in a variety of inflator configurations. As those skilled in the art will appreciate, changing the design of the filter and housing configuration will alter the combustion level and temperature which will change the CO and NOx content of the combustion gas. As an example, reduction of the combustion temperature by using a coolant, on the one hand, gives disadvantages relating to CO and NOx content as well as output levels. On the other hand, high output temperatures lead to potential disadvantages with respect to damage to the airbag. Gas generator development should be understood to be a task of balancing contradicting properties in order to fulfill very special requirements. The concept of the inventive filter can be readily appreciated by those skilled in the art, which can easily make the required modifications to result in a gas generator of desired parameters.

EXAMPLE I

Preparation of Gas Generant and Test Inflator

A one Kg batch of a gas generant composition was formulated according to Table I below. The composition was prepared by grinding the individual components (when needed, i.e., sodium nitrate) to a particle size of less than 100 microns and then all of the components of the generant were sifted and then blended in a Turbula® mixer (manufactured by W.A.B. of Switzerland). Mixing continued for one (1) hour.

TABLE I

| Values in Parts by Weight | | | | | |
|---|---|---|---|---|---|
| Nitroguanidine | Guanidine nitrate | Strontium nitrate | Ammonium perchlorate | Sodium nitrate | CuCr |
| 15.5 | 41.5 | 8.8 | 22.8 | 11.4 | 0.25 |

The material was then pelletized with a rotary pellet press. The pellets were about 5.05 mm in diameter, 1.0 mm high, weighed about 33 mg each and had a density of about 1.6 to 1.7 g/cm3. The test inflator used in the following examples is based upon a design presently used in side impact airbag systems and is similar to that disclosed in FIG. 1. The inflator housing consisted of a steel tube approximately 195 mm in length and 25 mm in diameter. One end of the tube was closed so that the housing member resembled a large test tube. Eight (8) apertures of about 2.65 mm in diameter were drilled proximate the closed end of the tube. A 4.25 by 8.25 inch piece of cold rolled expanded steel was obtained from Metalex of Libertyville, Ill. The size of the openings in the expanded metal were about 0.166 inches. The weight of this sheet of expanded metal was about 65 grams. The sheet of expanded metal was then rolled along the 4.25 inch edge to form a tube comprising four (4) wraps of expanded metal. The outside diameter of this tube was less than the interior diameter of the housing. The expanded metal tube was then inserted into the housing and driven into the closed end of the housing through the use of a hand operated press. Sufficient force was applied to the expanded metal tube so that the ends of the tube adjacent the closed end of the housing were forced together in a crimped over fashion. About 30 grams of expanded metal chips were prepared by cutting a piece of stainless steel expanded metal obtained from Spantek of Hopkins, Minn. into ¼ inch by ¼ inch squares. These chips were placed into the inflator housing and filled the void surrounded by the expanded metal tube. The expanded metal chips were then lightly compressed and a choke plate was then inserted. The steel choke plate possessed five (5) apertures of 5 mm in diameter. A 7-mil aluminum foil was then placed over the choke plate to cover the five (5) apertures and then the choke plate was inserted and pressed into the housing to reach physical engagement with the expanded metal tube. About 17 grams of the gas generant pellets described above were loaded into the housing. The igniter was then pressed into the housing and welded.

The outside burst foil or tape was a thin sheet (0.002 inches) of stainless steel with an adhesive on one side. The adhesive side of the burst foil is placed against the outside surface of the inflator housing so as to hermetically seal all apertures. Two wraps of foil were applied over the apertures. The test inflator housing had a total volume of about 58.4 cm3, while the region containing the pellets of gas generating material had a volume of about 12.2 cm3. The inflator also incorporated about 0.3 g of BKNO3 (a mixture of boron nitrate and potassium nitrate, conventionally used in the industry), as an enhancer and was associated with the igniter.

EXAMPLE II

Testing of the Inflator

Particulates

A number of inflators as prepared in Example I were evaluated in a 100 cubic foot test chamber fitted with equipment to record the pressure and time profile of the combustion and to analyze the gases exiting the inflator. The amount of particulate or slag exiting the inflator housing was also determined using standardized techniques. The airborne particulate was collected using a single stage collection device. The gas samples were also analyzed for ammonia, benzene and various other gases using a Fourier Transform Infrared Spectrometer (FTIR) at intervals of before deployment (background), 1, 5 10, 15 and 20 minutes after deployment. The samples were transferred directly to the FTIR gas cell from the 100 cubic foot tank via 6 foot of ¼ inch outside diameter fluoropolymer tubing. The test inflators were installed into the tank and ignited. The temperature of the inflators at firing was about 23° C.+2° C. at a relative humidity of about 43%.

Total particulate production was also collected. Following venting of the tank to the atmosphere, the interior of the 60 liter tank was carefully scrubbed and rinsed with deionized water to measure particulate production. The particulate produced by gas generants comprises a mixture of water soluble and insoluble reaction products. The aqueous mixture of the soluble reaction products and the insoluble dust were analyzed to determine total particulate production. The total airborne particulate concentration for this test was 29 mg/m3. The average total particulate production for two (2) tests was 68.5 mg/m3.

Gaseous Reaction Products

The ammonia, benzene, carbon dioxide, formaldehyde, hydrogen chloride, hydrogen cyanide, methane, sulfur dioxide, carbon monoxide (CO), nitric oxide (NO) and nitrogen dioxide (NO2) and water vapor levels of the gases produced in the 100 cubic foot tank are set forth in Table II.

TABLE II

Gaseous Effluent Data

|  |  | Ammonia | Benzene | Carbon Dioxide | Carbon Monoxide | Formaldehyde | Hydrogen Chloride |
|---|---|---|---|---|---|---|---|
| Analysis Method | | FTIR | FTIR | FTIR | FTIR | FTIR | FTIR |
| Detection Limit (ppm) | | 5 | 5 | 50 | 10 | 2 | 2 |
| Analysis Delay (min) | | 0.2 | 0.2 | 0.2 | 0.2 | 0.2 | 0.2 |
| Inflator No. 1 | 1 | <5 | <5 | 314 | 46 | <2 | <2 |
| | 5 | <5 | <5 | 594 | 79 | <2 | <2 |
| | 10 | <5 | <5 | 599 | 78 | <2 | <2 |
| | 15 | <5 | <5 | 585 | 77 | <2 | <2 |
| | 20 | <5 | <5 | 587 | 77 | <2 | <2 |
| | TWA 20 | <5 | <5 | 563 | 74 | <2 | <2 |

|  |  | Hydrogen cyanide | Methane | Nitric Oxide | Nitrogen dioxide | Sulfur dioxide | Water Vapor |
|---|---|---|---|---|---|---|---|
| Analysis Method | | FTIR | FTIR | FTIR | FTIR | FTIR | FTIR |
| Detection Limit (ppm) | | 2 | 5 | 2 | 0.5 | 5 | 500 |
| Analysis Delay (min) | | 0.2 | 0.2 | 0.2 | 0.2 | 0.2 | 0.2 |
| Inflator No. 1 | 1 | <2 | <5 | 8 | <0.5 | <5 | <500 |
| | 5 | <2 | <5 | 12 | 0.5 | <5 | <500 |
| | 10 | <2 | <5 | 11 | 0.6 | <5 | <500 |
| | 15 | <2 | <5 | 11 | 0.8 | <5 | <500 |

TABLE II-continued

| Gaseous Effluent Data | | | | | | |
|---|---|---|---|---|---|---|
| 20 | <2 | <5 | 11 | 0.7 | <5 | <500 |
| TWA 20 | <2 | <5 | 11 | 0.6 | <5 | <500 |

The results set forth in Table II demonstrate that the filtration system of the present invention is acceptable for use in an automobile restraint system. The filtration system of the present invention provides a reasonably non-toxic combustion gas with acceptable levels of particulates.

EXAMPLE III

Comparatives

In this experiment, two (2) identical side impact inflators were built in accordance with Example I, except that one inflator (Control I) replaced the filtration system according to the invention with 59 grams of ¼×¼ inch cold rolled steel, expanded metal chips (no geometric form). Experimental Inflator II used 43 grams of sheet expanded metal and 27 grams of the chips. The inflators were tested in a 60 liter tank and particulate and gas analysis was conducted. The results are set forth in Tables III and IV.

TABLE III

| | Particulate Production | | |
|---|---|---|---|
| Test Inflator | Insoluble Particulates (mg) | Soluble Particulates (mgs) | Total (mgs) |
| Control I | 557 | 556 | 1113 |
| Exp. II | 119 | 276 | 395 |

These data indicate that the combination of the sheet expanded metal with the chips for the filter system is almost three (3) times as effective in removing particulates from the combustion gas than the use of expanded metal chips alone.

Airborne particulates and gas analysis, as described above, was also conducted. The results are set forth in Table IV.

TABLE IV

| | Airborne Particulates and Gas Analysis | | | | | |
|---|---|---|---|---|---|---|
| Test Inflation | Airborne Particulate (mg) | CO (ppm) | NO (ppm) | $NO_2$ (ppm) | $NH_3$ (ppm) | $CO_2$ (%) |
| Control I | 101 | 9394 | 151 | 21 | <5 | 1.2 |
| Exp. I | 82 | 4284 | 171 | 23 | <5 | 2.0 |

The tank pressure versus time curves for both inflators were acceptable and very similar in profile and in area under the curve. One major difference between the Control Inflator and the Experimental Inflator was the color of the particulates produced. The Control inflator produced a black soot-like particulate while the Experimental Inflator produced a light, off-white colored particulate. This observation is supported by the higher level of airborne particulates produced by the Control Inflator (101 vs. 82). Those skilled in the art will readily appreciate that the filtration system according to the invention is highly desirable as it produces about one half of the carbon monoxide, higher levels of carbon dioxide and a light colored airborne particulate.

EXAMPLE IV

Inflator Without Chips

In this Experiment, a four piece steel housing of 207 mm by 29 mm was used. 15 gms of the gas generant described in Example I was loaded into the inflator. 81 gms of expanded metal sheet rolled into a coil was placed between the gas generant bed and the exit portals. No expanded metal chips were placed in the inflator housing. The inflator was tested in a 60 liter tank and insoluble particulate production was determined to be 79 mgs; soluble particulates at 189 mgs for a total particulate production of 268 mgs. Gas analysis indicated 125 mgs of airborne particulates per cubic meter, carbon monoxide at 4148 ppm, NO at 226 ppm, NO2 at 50 ppm and CO2 at 2.1%. This experiment evidences that expanded metal sheet formed into a hollow, geometric shape, without chips of expanded metal filling the void will not perform satisfactorily as a filter for an airbag inflator.

The inventor believes that the combination of sheet expanded metal and expanded metal chips is synergistic in that it allows the gas to be cleaned very well (low particulates) and is cool enough for use in side impact inflators. The inventor's other work has convinced him that use of the expanded metal alone, irrespective of shape (geometric form) is incapable of sufficiently cooling the combustion gases. Further, the use of expanded metal chips alone failed because, upon combustion of the gas generant, the chip bed compressed, thus increasing pressure which resulted in a dramatic increase in temperature.

The inventor has also found that through the use of his inventive filter system, combustion gas temperature, irrespective of gas generant type and housing design, can be lowered almost 200° C. over conventional filter systems. Also as a result of his work, the inventor has determined that a weight ratio of filter system to gas generant is important in fully exploiting his invention. A weight ratio of at least 4:1, filtration system to gas generant, has been found satisfactory, while weight ratios of at least 5:1 are preferred and at least 6:1 being most preferred. In similar fashion and as disclosed above, the weight ratio of expanded metal sheet used to construct the geometric form to the amount of expanded metal chips has been determined to be important to the full utilization of the inventor's discovery. It has been found that a weight ratio of at least 10:1, more preferably 10:5, expanded metal sheet to the expanded metal chips is useful.

From these experiments and others that are being conducted at the time of the filing of this application, it is clear that the filtration system according to the invention is useful for inflating airbags and can also be used as chemical fire extinguishers. The filtration system of the invention is low in cost and is readily adaptable to automated production.

The automobile industry is constantly in search of improvements associated with airbag inflators. The industry is also in need of side impact inflators that are not hybrid inflators and which reduce the potential for bag damage upon inflation. The filtration system of this invention and the process for its manufacture meet these needs. Further, through the use of a novel combination of materials and a unique process of production, the filtration systems of the invention produces a very acceptable gas for the inflation of airbags. Further, the filtration systems according to this invention would also find use in fire extinguishing systems using solid energetic materials for producing fire extinguishing gases. The filtration system according to the invention is low in cost, easily incorporated into the inflator housing, is highly effective in trapping particulates formed during the combustion of the generant and cooling the generated gas.

Although the present invention has been disclosed in connection with a few embodiments thereof, variations and modifications may be chosen by those skilled in the art without departing from the principles of the invention. All of these variations and modifications are considered to be within the spirit and scope of the present invention as disclosed in the foregoing description and defined by the appended claims.

What is claimed is:

1. An inflator for use in inflating an occupant restraint system in response to a vehicle collision signal comprising:
   a) housing means defining at least one discharge port for directing a gaseous flow from said housing means;
   b) gas generating means disposed within said housing means;
   c) an ignition unit; and
   d) a filter means wherein said filter means is disposed between said discharge port and said gas generating means, said filter means comprising:
      i) a sheet of expanded metal; and
      ii) chips of expanded metal positioned between the gas generating means and the sheet of expanded metal.

2. The inflator according to claim 1 wherein said expanded metal has apertures therethrough of at least 0.8 mm on each side or in diameter.

3. The inflator according to claim 2 wherein said apertures are at least 1.5 mm.

4. The inflator according to claim 1 wherein said sheet of expanded metal is configured to define a void and said chips of expanded metal are within said void.

5. The inflator according to claim 1 wherein the weight ratio of said sheet to chips is less than 10 to 1.

* * * * *